United States Patent
Zuniga (10) Patent No.: US 7,356,200 B2
(45) Date of Patent: Apr. 8, 2008

(54) METHOD AND DEVICE FOR DETERMINING SKEW ANGLE OF AN IMAGE

(75) Inventor: Oscar A. Zuniga, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 750 days.

(21) Appl. No.: 10/701,282

(22) Filed: Nov. 3, 2003

(65) Prior Publication Data
US 2005/0094897 A1 May 5, 2005

(51) Int. Cl.
G06K 9/36 (2006.01)
G01C 9/00 (2006.01)

(52) U.S. Cl. ............. 382/289; 382/286; 382/290; 382/291; 382/292; 702/150

(58) Field of Classification Search ......... 382/276, 382/289, 290, 293–298
See application file for complete search history.

(56) References Cited

U.S. PATENT DOCUMENTS

| | | | | |
|---|---|---|---|---|
| 4,558,461 A | * | 12/1985 | Schlang | 382/290 |
| 4,611,232 A | * | 9/1986 | Searby | 348/583 |
| 5,093,653 A | * | 3/1992 | Ikehira | 345/657 |
| 5,359,677 A | * | 10/1994 | Katsurada et al. | 382/290 |
| 5,497,236 A | * | 3/1996 | Wolff et al. | 358/296 |
| 5,517,587 A | * | 5/1996 | Baker et al. | 382/296 |
| 5,568,571 A | * | 10/1996 | Willis et al. | 382/254 |
| 5,854,853 A | * | 12/1998 | Wang | 382/176 |
| 5,940,128 A | * | 8/1999 | Morimura | 348/240.3 |
| 6,310,984 B2 | | 10/2001 | Sansom-Wai et al. | |
| 6,360,026 B1 | | 3/2002 | Kulkarni et al. | |
| 6,373,590 B1 | | 4/2002 | Ancin et al. | |
| 6,490,376 B1 | | 12/2002 | Au et al. | |
| 6,549,680 B1 | * | 4/2003 | Revankar | 382/289 |
| 6,574,375 B1 | | 6/2003 | Cullen et al. | |
| 7,050,650 B2 | * | 5/2006 | Maurer et al. | 382/275 |
| 7,139,441 B2 | * | 11/2006 | Aihara | 382/298 |
| 2001/0021277 A1 | * | 9/2001 | Hamamura | 382/289 |
| 2004/0052430 A1 | * | 3/2004 | Albertelli et al. | 382/289 |

* cited by examiner

Primary Examiner—Jingge Wu
Assistant Examiner—José M Torres (57) ABSTRACT

Methods and apparatuses for determining a skew angle of text relative to an axis are disclosed herein. One exemplary embodiment of the method comprises locating a first portion of the text that has a spatial frequency greater than a first preselected value. The method continues with locating a second portion of the text that has a spatial frequency greater than a second preselected value. A line is fitted between the first portion of the text and the second portion of the text. The angle between the line and the axis is measured, wherein the angle corresponding to the skew angle.

28 Claims, 9 Drawing Sheets

METHOD AND DEVICE FOR DETERMINING SKEW ANGLE OF AN IMAGE

BACKGROUND

Imaging devices, such as scanning devices and digital cameras, generate machine-readable image data (sometimes referred to simply as image data) representative of an image of an object. One example of an object is a document having text printed thereon. In some scanning devices, the document is set on a platen and image data is generated by a carriage moving relative to the platen within the scanning device. The carriage has devices located therein that generate image data representative of an image of the object located on the platen. The process of generating image data representative of an image of the object is sometimes referred to as scanning the object. In other scanning devices, the document is placed into an automatic document feeder and then moved past a stationary component, such as a stationary carriage, that scans the document. Digital cameras, on the other hand, generate image data by focusing the image onto a two-dimensional photosensor device that generates image data without the need for moving a carriage.

The image data is typically transmitted to a viewing device that replicates the image of the scanned object based on the image data. For example, the viewing device may be a video monitor that processes the image data to display the image of the object. In another example, the viewing device may be a printer that processes the image data to print an image of the object.

The viewing devices have reference axes that a user references when viewing displayed or printed images. For example, in the situation where the viewing device is a video monitor, the user may establish a horizontal axis of the top or bottom edge of the video monitor. In the situation wherein the object is text, the text is expected to be displayed parallel to the horizontal axis. In the situation where the display device is a printer, the reference axis may be a horizontal or vertical edge of the printed paper.

If the image has features that the reader expects to be horizontal or vertical and they are skewed relative to the horizontal or vertical axis, the image may be difficult to interpret. For example, if the text in a document is not parallel to the horizontal axis or is not perpendicular to the vertical axis, the text may be difficult to read. Furthermore, an optical character recognition engine will likely be unable to recognize the skewed characters.

Various factors in the scanning process may cause the displayed image to be skewed. For example, if a document set on the platen of a scanner is skewed, the resulting image will be skewed. Likewise, if a document becomes skewed as it is passed by a carriage in a scanner, the resulting image will be skewed. In the situation where the imaging device is a digital camera, the user may tilt the camera during the period which the image data is generated. This tilting will cause the resulting image to be skewed.

SUMMARY

Methods and apparatuses for determining a skew angle of text relative to an axis are disclosed herein. One exemplary embodiment of the method comprises locating a first portion of the text that has a spatial frequency greater than a first preselected value. The method continues with locating a second portion of the text that has a spatial frequency greater than a second preselected value. A line is fitted between the first portion of the text and the second portion of the text. The angle between the line and the axis is measured, wherein the angle corresponding to the skew angle.

DETAILED DESCRIPTION

Figure 1:
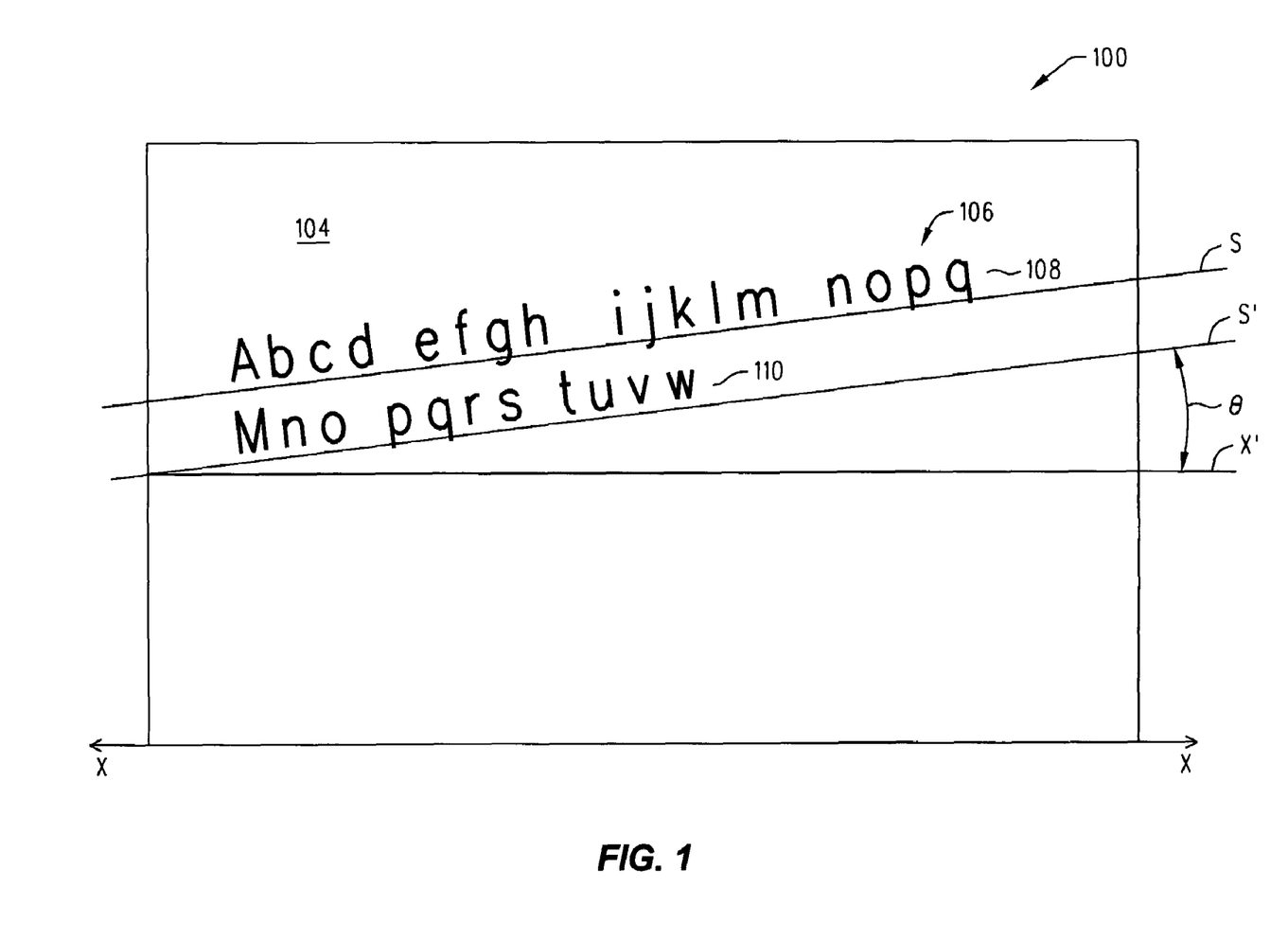
FIG. 1 is a schematic illustration of a viewing device displaying skewed text.

A viewing device 100 having a face 104 is shown in FIG. 1. It should be noted that the viewing device 100 of FIG. 1 is, for illustration purposes, an enlarged, partial view of a viewing device. In the embodiment of the viewing device 100 described herein, the face 104 is displaying text 106. The embodiment of the text 106 shown in FIG. 1 has a first line of text 108 and a second line of text 110. The text 106 shown herein has been greatly enlarged in order to better illustrate the methods for determining skew angle. The viewing device 100 may be any device that produces an image based on machine-readable image data (sometimes referred to herein simply as image data) that is processed by the viewing device 100. Examples of imaging devices include video monitors and documents printed by printers. It should be noted that the methods and apparatuses described herein for determining and correcting skew angle may be applied to images other than text.

An image is typically displayed by the viewing device 100 using a plurality of picture elements or pixels. A pixel is similar to a dot that may be bright, dark, or multiple levels of gray therebetween. The image data determines the gray scale associated with each pixel depending on a pixel value assigned to each pixel. For example, the image data and thus, the pixel values, determine whether pixels are bright, dark, or levels of gray therebetween. When displaying text, a plurality of dark pixels may be combined on a background of bright pixels to generate an image, such as black text characters displayed on a white background.

In one embodiment, the viewing device 100 is a video monitor having the text 106 displayed thereon. In another embodiment, the viewing device 100 is a piece of paper wherein the text 106 is printed on the paper by a printer. The image data from which the text 106 was produced may be generated by many sources. In one embodiment, an original document (not shown) having the text printed thereon is scanned by a scanner. The scanner generates the image data representative of the text, which may be replicated to display the text 106. In another embodiment, a digital camera (not shown) generates the image data.

For reference purposes, two axes, an X axis and a Y axis, are used as references for the viewing device 100. The axes X and Y are also used to locate the text 106 and the skew angle of the text 106 relative to the viewing device 100 as described in greater detail below. The axes X and Y are substantially orthogonal and may be fixed relative to the viewing device 100. For example, in an embodiment of the viewing device 100 being a piece of paper, the axes X and Y may be the edges of the paper. In an embodiment of the viewing device 100 being a video monitor, the axes X and Y may be edges of the video monitor.

As shown in FIG. 1 and as described above, the text 106 is printed on two lines, which are referenced as the first line of text 108 and the second line of text 110. The first line of text 108 extends along or parallel to an S axis, and the second line of text 110 extends along or parallel an S' axis. The S and S' axes are aligned with areas of bright/dark contrast in the image displayed on the face 104 of the viewing device 100. Thus, in the example of the text 106 of FIG. 1, the S and S' axes are aligned with edges of the characters of the text 106. An X' axis that is parallel to the X axis intersects either or both the S axis and/or the S' axis. An angle $\theta$ between either the S axis or the S' axis and the X' axis is the skew angle that will be calculated herein.

Because the image displayed on the face 104 of the imaging device 100 is text, the S axis may be substantially parallel to the S' axis. However, in other embodiments, such as images of landscapes, there may only be one axis that has a significant bright/dark contrast. For example, an image of a landscape may have only one axis of bright/dark contrast being the horizon. Such an embodiment may only have the S axis and not the S' axis.

Figure 2:
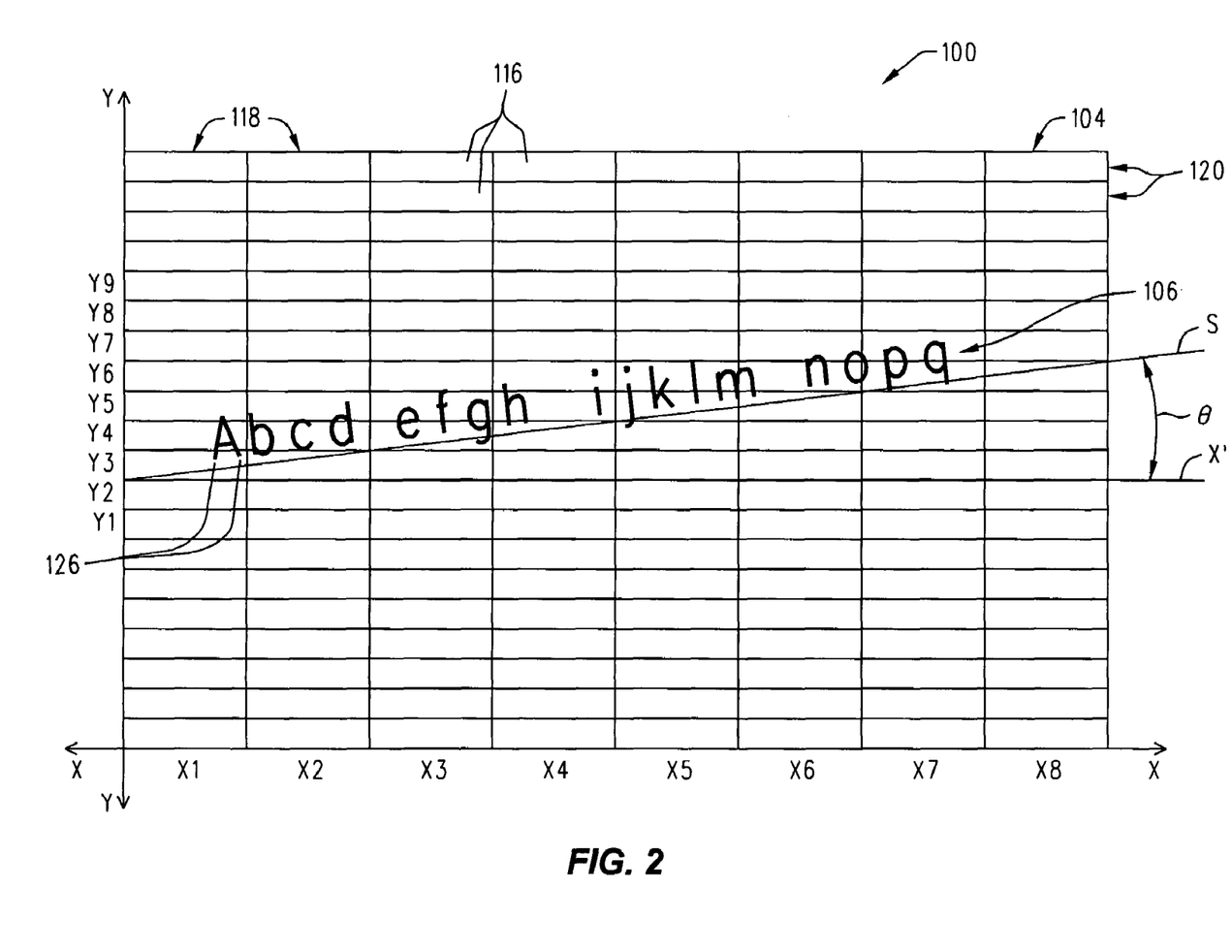
FIG. 2 is a schematic illustration of the face of the viewing device of FIG. 1 formed into a two-dimensional array of tiles.

Having described the skew angle $\theta$, an exemplary embodiment of calculating the skew angle $\theta$ will now be summarily described followed by a more detailed description. The skew angle $\theta$ is calculated by first down-sampling the face 104 of the viewing device 100. More specifically, the pixel values that generate images displayed on the face 104 of the viewing device 100 are down-sampled. Referring to FIG. 2, the down-sampling creates an array of pixel groupings or tiles 116 extending parallel to both the X axis and the Y axis. The pixel values in each of the tiles 116 are then sampled. For example, the samples may be the average pixel value of each of the tiles 116. The differences of the samples between adjacent tiles 116 are then calculated along an axis. In the embodiment of the image data being representative of text, the differences are calculated along the Y axis.

At this point, an array exists of the differences between adjacent sampled tiles, wherein the differences are calculated along the Y axis. Large differences represent areas of sharp bright/dark transitions or contrasts in the image. For example, in the embodiment where the image data is representative of text, large differences represent the edges of text characters set on a contrasting background.

A search is conducted for a difference (sometimes referred to as the first difference) exceeding a first preselected value. The search typically commences at an edge, i.e., the left edge, of the array and is conducted as a raster-type scan parallel to the same axis that the differences were calculated. In the embodiment of the image being text, the search is conducted in the columns 118 which are parallel to the Y axis. When the first difference is located, differences adjacent the first difference and in a column adjacent the column where the first difference is located are analyzed to locate the greatest adjacent difference (second difference). A third and subsequent adjacent differences are located in third and subsequent columns in the same manner that the second difference was located. Various techniques for locating subsequent differences are described below in greater detail.

The locations of the differences are fitted along a calculated axis or line. After the effects of the down-sampling are taken into account, the calculated axis will be substantially parallel to the S axis of FIG. 2. As set forth above, the angle between the S axis and the X axis (or X' axis) is the skew angle $\theta$. Accordingly, the angle between the X' axis and the calculated axis is substantially equivalent to the skew angle $\theta$. When the skew angle $\theta$ has been calculated, a rotation algorithm may be applied to the image data so as to rotate the image data representative of the image data and cancel the skew angle $\theta$.

Having summarily described an exemplary embodiment for determining and correcting skew angle, a more detailed description of the process will now be provided.

Figure 3:
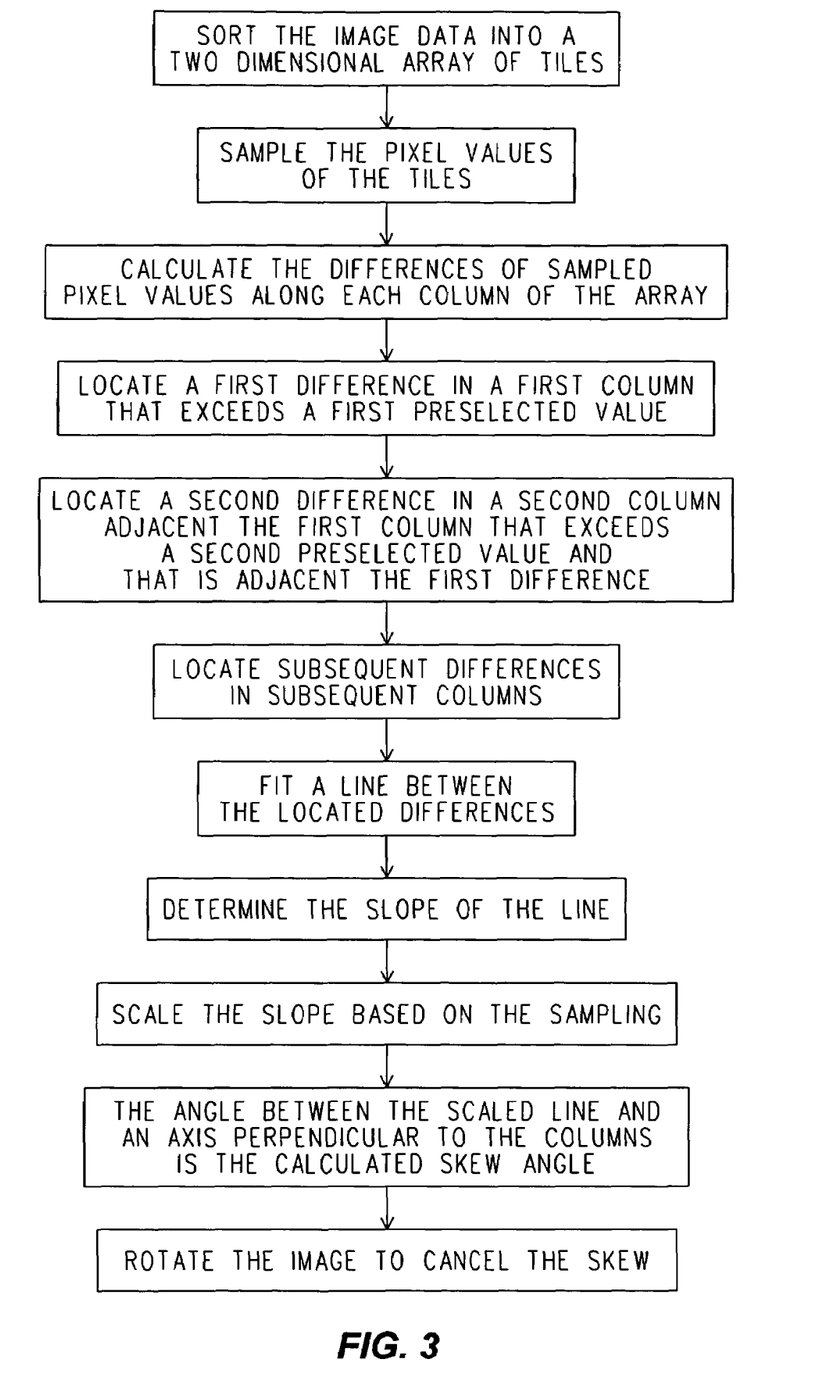
FIG. 3 is a flowchart describing an embodiment for determining the skew angle of the text of FIG. 1.

Referring to FIG. 1, the image data may be stored on a computer-readable medium. Likewise, a computer program that analyzes the image data, as set forth below, to calculate the skew angle may also be stored on a computer-readable medium. A computer-readable medium may include an electronic, magnetic, optical or other physical device or means that can store a computer program and data for use by or in connection with a computer-related system or method. A computer-related system or method may run the program and analyze the image data to determine if an image represented by the image data is skewed. A flow chart of an example of such a program is shown in FIG. 3 and is representative of an embodiment of the following description. The flow chart of FIG. 3 serves as an exemplary embodiment of a process for determining skew angle. Accordingly, other embodiments of the process may include more or less steps than shown in the flow chart of FIG. 3. In addition, the steps described in FIG. 3 may be modified for specific embodiments.

As shown in FIG. 2, the text 106 displayed or printed on the face 104 of the viewing device 100 is skewed at the skew angle $\theta$ relative to the X' axis. As described above, the text is generated by bright/dark transitions in the pixels (not shown) located on the face 104 of the viewing device 100. For example, the background of the face 104 may be comprised of bright pixels and the text 106 may be comprised of dark pixels. The pixel values representative of the bright pixels may be relatively high numbers, and the pixel values representative of the dark pixels may be relatively low numbers. It should be noted that in some imaging systems, bright pixels are representative of relatively low pixel values, and dark pixels are representative of relatively high pixel values.

The face 104 of the viewing device 100 is divided into an array. The array has a plurality of tiles 116 or pixel groupings. The tiles 116 are arranged to form a plurality of columns 118 extending parallel to the Y axis and a plurality of rows 120 extending parallel to the X axis. The plurality of columns 118 are sometimes referred to herein as the first plurality of pixel groupings and the rows 120 are sometimes referred to herein as the second plurality of pixel groupings.

In one non-limiting embodiment, each of the tiles 116 are rectangular and have approximately sixty-four pixels extending parallel to the X axis and sixteen pixels extending parallel to the Y axis. The length to which a tile extends parallel to the Y axis is referred to as the height of the tile, and the length to which a tile extends parallel to the X axis is referred to as the width of a tile. The heights of the tiles in such an embodiment are one-fourth the lengths of the bases. It should also be noted that tile sizes other than those described herein may be generated depending on the image data and the image that is represented by the image data. For example, in one embodiment, the tiles have heights of four pixels and widths of sixty four pixels.

The use of tiles 116 being sixty-four pixel values wide is an example of an embodiment used to determine skew angle of text. The following example is based on determining skew angle of text having a pitch of approximately ten characters per inch. The following example is further based on the image data representative of the text being generated using a sampling or precision of three-hundred dots per inch (dpi) or pixel values per inch, which is commonly used when scanning a printed document. Based on the tile sizes, each tile 116, on average, contains horizontal portions of 2.2 characters. Therefore, the probability is high that adjacent tiles 116 extending parallel to the X axis and through a sentence or word will contain portions of text characters. These adjacent tiles 116 may be analyzed to determine the skew angle θ as described in greater detail below. It should be noted that the number of pixel values constituting each of the tiles 116 may be set for a specific purpose and for a specific sampling rate. For example, if the image data is generated at a pitch of six-hundred dpi, the tiles 116 may have one-hundred twenty-eight pixel values extending along the X axis to yield an average of 4.4 horizontal portions of characters per tile.

The array of tiles 116 forms a Cartesian coordinate system wherein the columns 118 are referenced as columns X1 to X8, and some of the rows 120 are referenced as rows Y1 to Y9. In order to simplify the description, not all of the rows 120 have been referenced. The locations of the pixels that generate the text 106 are known by a computer or the like that calculates the skew angle θ. Therefore, the locations of the tiles 116 are also known by the computer. It should be noted that the pixels values, which determine the gray scale of the pixels, are actually analyzed to determine the skew angle θ.

The tiles 116 are then down-sampled. More specifically, the pixel values constituting the tiles 116 are down-sampled. Down-sampling reduces the number of pixel values represented by a tile. In the example of the tiles being sixty-four pixel values wide and sixteen pixel values high, the one-thousand twenty-four pixel values in each tile are represented by a single pixel value. In the non-limiting embodiment described herein, the pixel values are represented by the average pixel value. The same sampling procedure may be applied to the example of the tiles being sixty-four pixel values wide and four pixel values high wherein the two-hundred fifty-six pixel values in each tile are represented by a single pixel value that is the average of the two-hundred fifty-six pixel values. In the embodiment described above, the average pixel value will vary between zero for a very dark tile and two-hundred fifty-five for a very bright tile.

Figure 4:
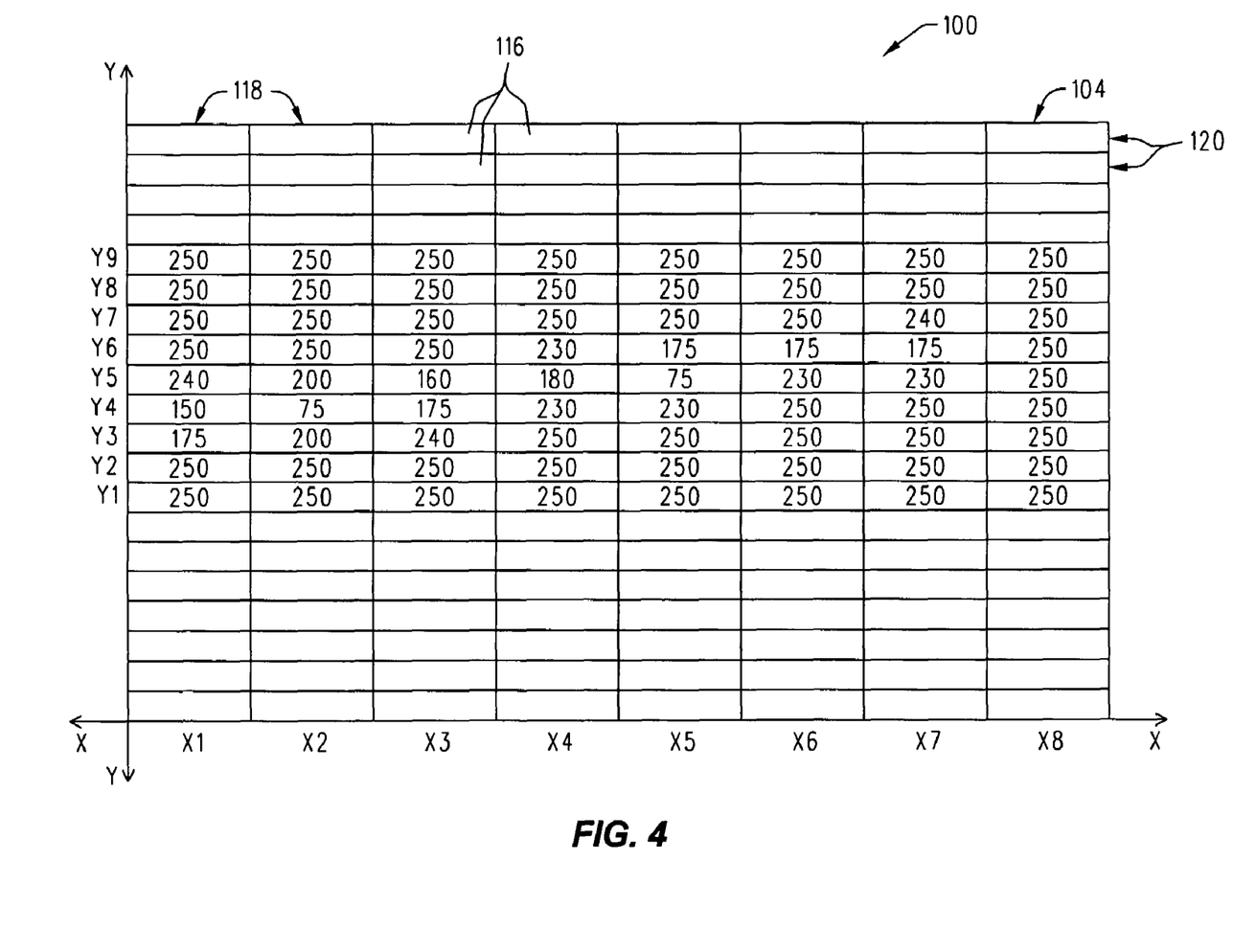
FIG. 4 is an array that is representative of the face of the viewing device of FIG. 2 depicting the average pixel values of the tiles.

An example of the text 106 of FIG. 2 after down-sampling and averaging the tiles is shown in FIG. 4. The numbers in the tiles 116 of FIG. 4 represent the average pixel value in each of the tiles 116. Thus, a tile of FIG. 4 that has a large number means that its corresponding tile in FIG. 2 includes few, if any, portions the text 106. A tile of FIG. 4 has a low number, on the other hand, means that its corresponding tile in FIG. 2 includes many portions of the text 106. It should be noted that the background has values of two-hundred fifty-five, which is for illustration purposes. In reality, the background would likely vary slightly, but the variation would have little, if any, affect on the calculation of the skew angle θ.

Down-sampling inherently causes the loss of some data. In the examples of the above-described rectangular tiles 116, the tiles 116 have widths that are greater than their heights. Therefore, a more accurate analysis regarding the pixel values extending parallel to the Y axis than the pixel values extending parallel to the X axis may be performed. Accordingly, data regarding small increments along the Y axis may be analyzed to accurately detect changes of pixel values, which is required to accurately calculate the skew angle θ in a text document. Other embodiments may detect small increments along the X axis, which are used to calculate the skew angle relative to the Y axis.

An edge detection algorithm is applied to the down-sampled array of FIG. 4 along an axis to detect bright/dark transitions along the axis; The edge detection algorithm, in summary, calculates the difference between sampled values of the tiles 116 along a given axis. In the embodiment to calculate the skew angle of a text document, the edge detection algorithm detects bright/dark transitions in the columns 118 along the Y axis. An example of an edge detection algorithm is achieved by application of a minus one over one kernel applied to the array of FIG. 4. The minus one over one kernel detects transitions from bright to dark when applied in the general direction of the row Y1 toward row Y2. More specifically, the minus one over one kernel outputs high values when a high contrast between the average value of the tiles 116 are present in the columns 118 when applied in the general direction of row Y1 toward row Y2. Accordingly, in the example where the displayed image is text, the edge detection kernel detects the lower edges of text characters. With reference to FIG. 1, the minus one over one kernel typically detects the edges of the characters proximate the S axis.

Figure 5:
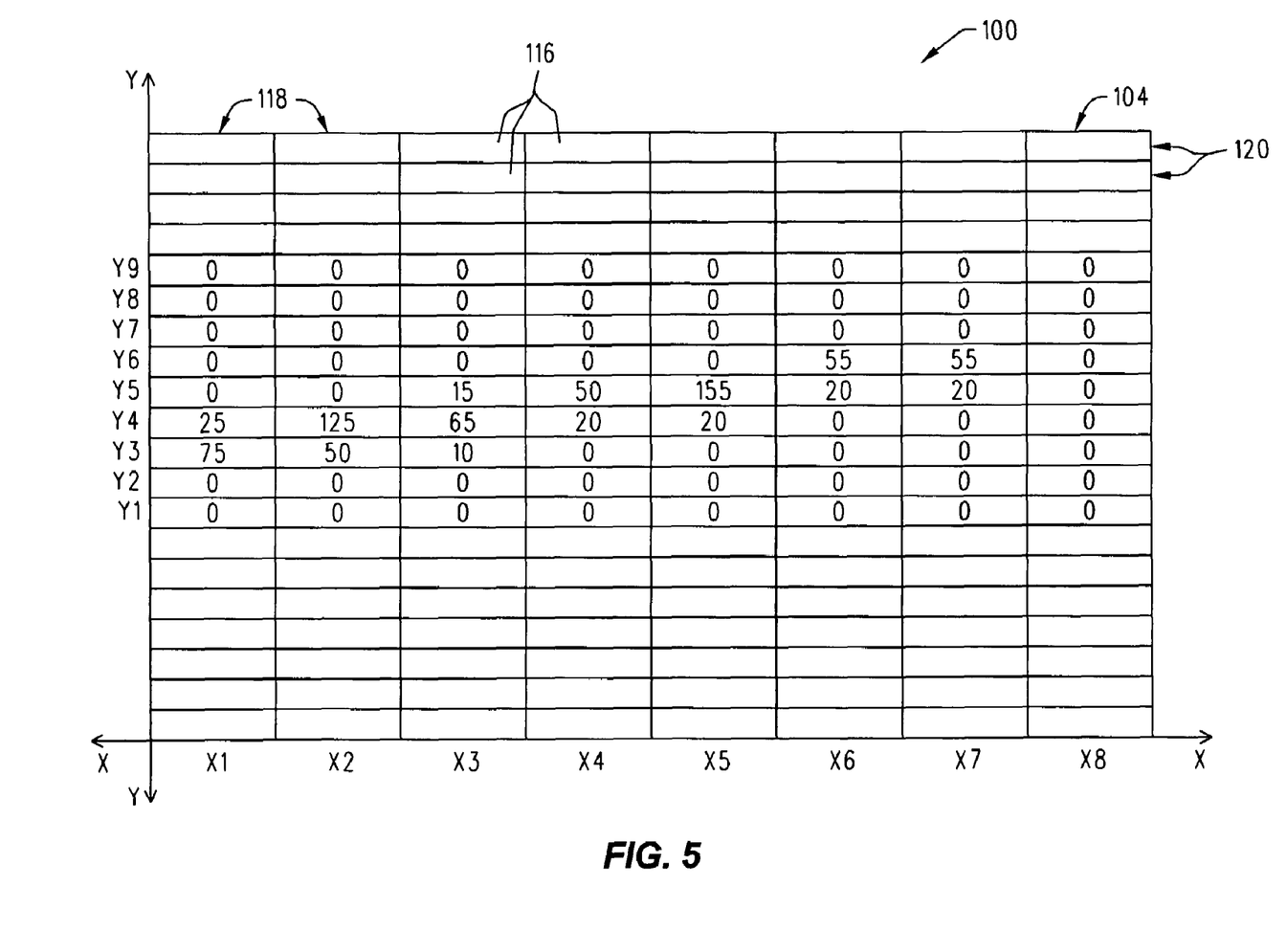
FIG. 5 is an array depicting an embodiment of calculating the differences between average pixel values of the tiles of FIG. 4.

FIG. 5 shows the results of a minus one over one kernel applied to the array of FIG. 4. It should be noted that in the non-limiting embodiment of the edge detection algorithm associated with FIG. 5, the edge detection algorithm sets the value of any negative output of the minus one over one kernel to zero. The elimination of the negative numbers when used with the above described edge detection kernel serves to primarily detect the lower edges of characters. For example, referring briefly to FIG. 2, the lower edges 126 of the character 'A' are predominately detected by the application of the minus one over one kernel described above. In some embodiments, the lower edges of text characters tend to have more useful data for skew angle detection than the upper edges. For example, the lower edges of text characters tend to be more likely to be located on an axis than the top edges of the text characters. Accordingly, in calculating the skew angle of a text document, detection of the lower edges of the text characters tends to be more beneficial. The use of other kernels and edge detection techniques is described in greater detail further below.

The analysis to calculate the skew angle θ, FIG. 2, continues by searching the array of FIG. 5 for a difference that exceeds a first preselected value. This difference is referred to as the first difference. The search in the non-limiting embodiment described herein commences in the column X1 and scans the rows between row Y1 and row Y9. The search locates a difference (first difference) that exceeds the first preselected value. The first difference corresponds to a bright/dark transition that exceeds a contrast corresponding to the first preselected value. With reference to the array of FIG. 5, the search may locate a first difference that has a value of at least seventy-five. In the search technique described above, the difference of seventy-five located at column X1, row Y3 will be located and identified as the first difference. Referring briefly to FIG. 2, the above-described search locates the lower edges 126 of the text character 'A'.

In some situations, a difference exceeding the first preselected value may not exist in the first column searched. In such situations, the search may continue in adjacent columns to locate the first difference. If no differences exceeding the first preselected value can be located, the image may not contain a contrast that exceeds the first preselected value. Therefore, the first preselected value may be lowered to accommodate the features of the image. It should be noted that many different other search techniques exists and some of these other techniques are described in detail further below.

After the first difference is located, a search is conducted for a second difference. The search for the second difference is performed to locate a bright/dark transition that is associated with the first difference. For example, if the image data is representative of text, the second difference may be representative of characters that are adjacent characters corresponding to the first difference. If the image data is representative of a landscape, the first difference may be representative of a transition caused by the horizon and the second difference may correspond to a continuation of the horizon transition. The second difference is a difference that exceeds a second preselected value. In addition, the second difference is adjacent or close to the first difference and is located in a column that is adjacent or close to the column containing the first difference. In the present embodiment, the second difference is the greatest difference that meets the aforementioned criteria.

With reference to the above-described example, the second difference locates edges of characters in a tile that is next to the tile containing the lower edges 126 of the character 'A'. Further to the above-described example, the second difference is a difference that is adjacent the first difference and is located in a column adjacent the column containing the first difference. The second difference in the present embodiment is the greatest difference that meets the aforementioned criteria and exceeds a second preselected value. In the following example, the second preselected value is fifty. The difference meeting the above criteria has the value of one-hundred twenty-five and is located at column X2, row Y4. It should be noted that one embodiment for searching the second and subsequent differences has been described above, however, other embodiments may be used and some of these embodiments are described in greater detail further below.

In the non-limiting embodiment described herein, the second preselected value is less than the first preselected value. It should be noted that the preselected values are minimal differences that are searched. Thus, the greater first preselected value assures that the edge of a character or characters are located. Most likely, the lower edge of a character or characters are located. The use of the lower second preselected value enables the searching to locate character edges that may not be as sharp as the ones resulting in the aforementioned first difference. Therefore, a continuous string of differences may be located even though some of the differences do not represent contrasts that are as sharp as the first difference. In addition, the use of the greater first preselected value reduces the possibility that a string of differences may be the result of noise. More specifically, the greater first preselected value reduces the possibility that a string of differences is created due to the detection of noise. Noise typically creates differences that are less than the differences created by the edges of text.

As set forth above, pursuant to the present embodiment, the second difference is at the tile located at column X2, row Y4. More specifically, as shown in FIG. 5, the first difference was located in column X1, accordingly, the second difference must be located in column X2. The differences adjacent the first difference are column X2, rows Y2, Y3, and Y4. The difference of fifty at the tile in column X2, row Y3 and the difference of one-hundred, twenty-five at the tile at column X2, row Y4 both meet or exceed the second preselected value of fifty. However, the difference of one-hundred twenty-five at the tile at column X2, row Y4 is the greatest value and is, accordingly, the second difference.

Subsequent differences are located in the same manner that the second difference was located. For example, a third difference of sixty-five is located at column X3, row Y4, and a fourth difference of fifty is located at column X4, row Y5. In the present embodiment, differences are continually located until one of the aforementioned criteria cannot be achieved. In the example of FIG. 5, there are no differences exceeding the second preselected value of fifty located in column X8. Therefore, the searching process ceases at column X7.

Figure 6:
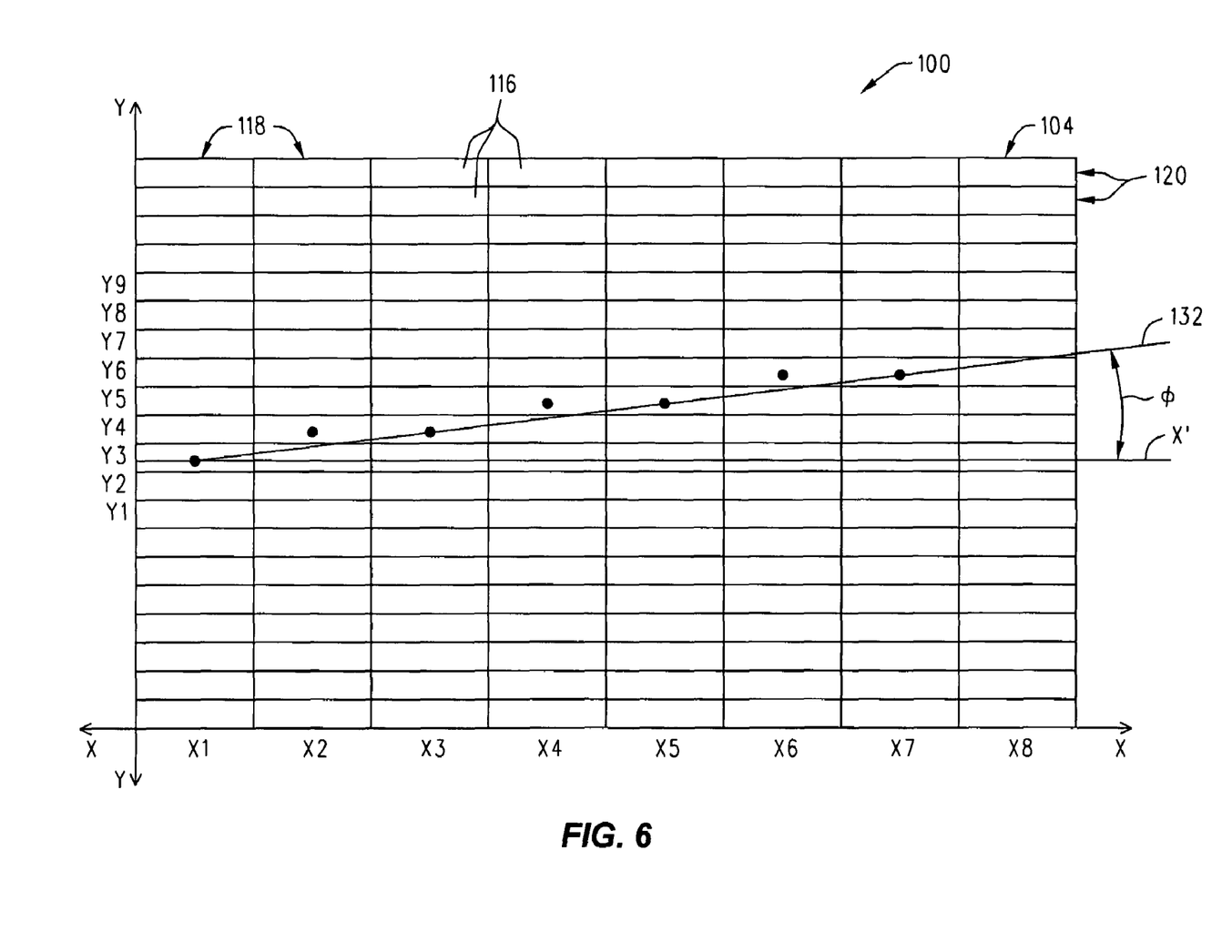
FIG. 6 is the array of FIG. 5 indicating the results of application of an embodiment of a search criteria.

A string of differences meeting the above-described difference criteria are shown with markers located therein in FIG. 6. The string of differences extends between the tile at column X1, row Y3 and the tile at column X7, row Y6. The slope of these marked tiles is calculated to determine an angle φ. More specifically a line 132 is fitted to the marked tiles wherein the angle φ represents the intersection of the line 132 and the X' axis. It should be noted that several algorithms exist for fitting the line 132 to the marked tiles. In the non-limiting embodiment provided herein, the line 132 is drawn between the tile at column X1, row Y3 and the tile at column X7, row Y6. When the line 132 is fitted to the marked tiles, the slope of the line 132 and, thus the angle φ, are readily determined.

The line 132 is one example of a line fit to the string of differences, and it should be noted that other methods of fitting the line 132 to the string of differences may be used. For example, linear regression or a least-squares fit may be used to fit a line to the string of differences.

As shown in FIG. 6, the slope of the line 132 is three over six (one half. The tiles 116, however, were generated using down-sampling. Therefore, in order to calculate the skew angle, the slope of one half must be scaled proportional to the down-sampling. In the example disclosed above, each down-sampled tile constituted sixteen pixel values along the Y axis and sixty-four pixel values along the X axis. Accordingly, the slope of the line 132 has to be multiplied by sixteen over sixty-four in order for the calculated skew angle to be proportional to the actual skew angle θ, FIG. 1. Thus, the slope associated with the calculated skew angle is one over eight, which yields a calculated skew angle of 7.1 degrees. A rotation algorithm may then be applied to the image data in order to manipulate the image data so that the image represented by the image data is rotated 7.1 degrees in a direction opposite the skew, such as clockwise and counterclockwise directions.

It should be noted that the calculated skew angle may be slightly different than the actual skew angle θ shown in FIG. 1 due to accuracy that is lost during down-sampling. The loss of accuracy is due to approximations made in sampling the tiles 116, FIG. 2. Even though there is some loss due to sampling, sampling is inherent in determining the skew angle. The calculated skew angle will be close enough to the actual skew angle so that skew may be attenuated to a point where a reader is likely unable to notice it. In addition, the embodiment described above wherein the tiles 116 have four pixel values extending along the Y axis is typically more accurate that the embodiment of sixteen pixel values extending along the Y axis. This improved accuracy is due to less approximation along the Y axis during down-sampling. As described in greater detail below, the accuracy of determining the skew angle may be significantly increased by analyzing the skew angles from a plurality of strings of differences.

Having described an embodiment of calculating and correcting skew angle, other embodiments will now be described.

In one embodiment, several lines or strings of text are analyzed to determine the skew angles of the individual lines of text. In summary, the individual skew angles are analyzed to more accurately determine the skew angle of the entire image. An example of analysis of multiple lines of text is shown in FIG. 1, which as described above has a first line of text 108 and a second line of text 110. Each line of text may be evaluated to determine the skew angle.

Figure 7:
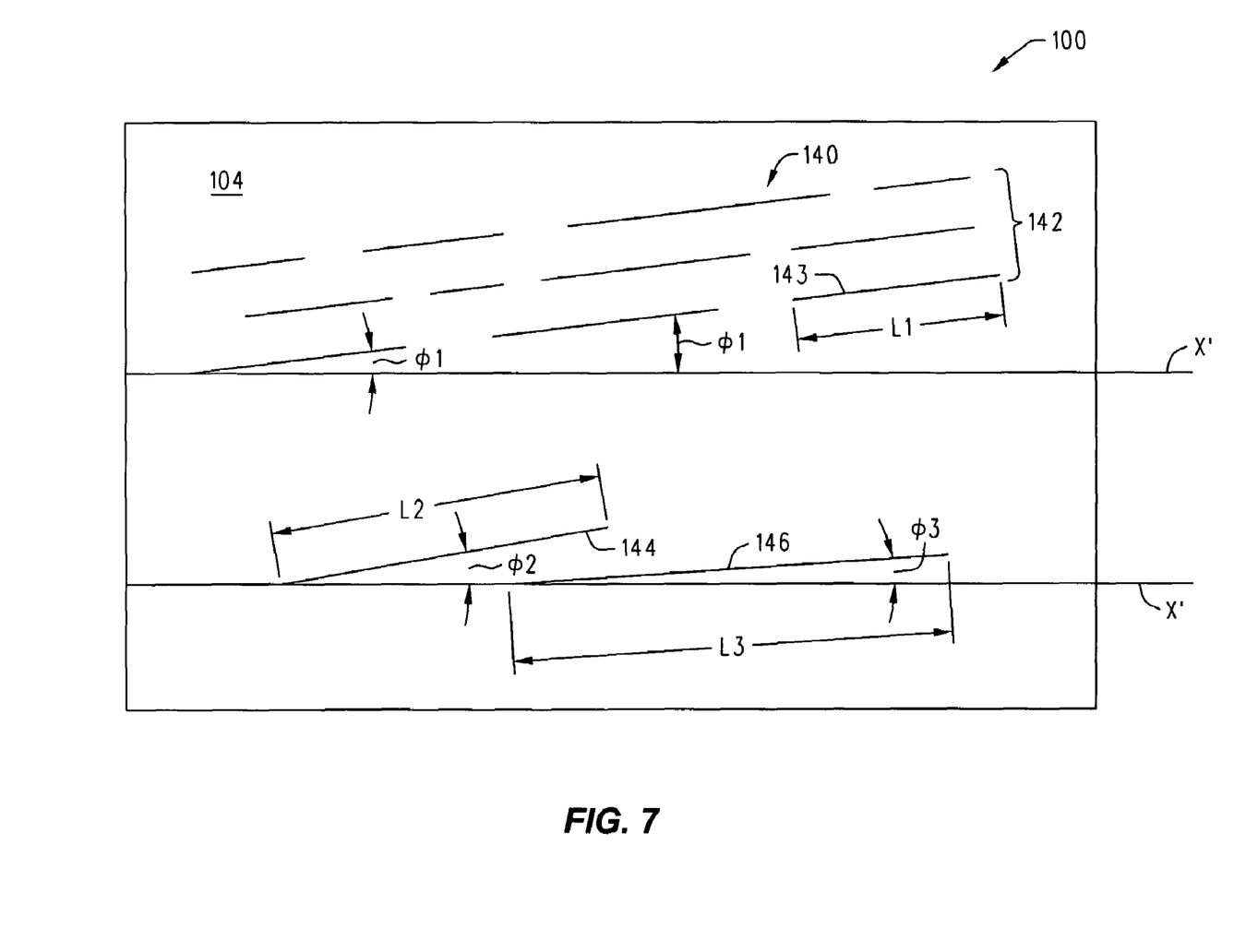
FIG. 7 is the array of FIG. 6 showing the results of analyzing several lines of data.

When this embodiment is applied to the single line 132 of FIG. 6, several lines 140 are generated as shown in FIG. 7. The image or the viewing device represented by FIG. 7 may be substantially larger than the image or the viewing device 100, FIG. 1, represented by FIG. 6. This larger image accounts for the increase in the number of lines 140. Each of the lines 140 is representative of the above-described down-sampling and edge detection applied to bright/dark transitions in the image. For example, the lines 140 may be representative of several lines of text.

As described above, the X' axes are parallel to the X axis and are used to calculate the skew angle of the image represented by the image data. As with the embodiments described above, the angles between the lines 140 and the X' axes are proportional to the skew angle and must be scaled by the pitch of the down-sampling in order to accurately calculate the skew angle. In the embodiment shown in FIG. 7, a plurality of lines 142 may all intersect the X' axis at an angle $\phi 1$. If the lines 142 were the only lines generated after analyzing the image data, the skew angle is readily calculated by scaling the lines 140 associated with the angles $\phi 1$ as described above. It should be noted that the skew angle analysis may conclude that the angles $\phi 1$ are proportional to the skew angle even if the lines 142 intersect the X' axis within a preselected tolerance of the angle $\phi 1$.

Under some circumstances, some of the lines 140 may intersect the X' axes at angles outside the tolerance of the angle $\phi 1$. The analysis to determine the skew angle may then become more complex. For example, the analysis may generate a histogram to analyze the number of lines at each angle and the lengths of the lines. For example, if the analysis finds one very long line intersecting the X' axis at a first angle and a plurality of smaller lines intersecting the X' axis at a second angle, the skew angle may be based on the first angle. In such a situation, the image data may represent a scene or the like, and the very long line may represent a feature of the scene, such as a horizon, that should be parallel to the X axis.

An example of multiple lines being generated is also shown in FIG. 7. A plurality of lines 142 intersect the X' axis at an angle $\phi 1$. One of these lines is referenced as the first line 143 and has a length L1. A second line 144 has a length L2 and intersects the X' axis at an angle $\phi 2$. In the example provided herein, the angle $\phi 2$ is greater than the angle $\phi 1$. A third line 146 has a length L3 and intersects the X' axis at an angle $\phi 3$. In the example provided herein, the angle $\phi 3$ is less than the angle $\phi 1$. The numerous lines intersecting the X' axis at different angles requires further analysis in order to determine the skew angle. In some situations, the number of lines may be more relevant in determining skew angle than the lengths of the lines. For example, a text document may have more lines that are short and parallel to each other than a landscape image. In such a situation, the large number of parallel lines are analyzed to determine skew angle. The landscape image may have many skew lines and a few long parallel lines. In this situation, the long parallel lines are more relevant than the few skewed lines.

Referring again to the example of FIG. 7, if the length L3 of the third line 146 is much longer than any of the other lines, then the third line 146 may represent a very prominent feature of the image. For example, if the image is a landscape, the third line 146 may represent a bright/dark transition of a horizon. In such a situation, the lengths of the other lines may be shorter than the third line 146 and be skewed relative to one another, which is indicative of the image not being text. If, on the other hand, a preselected number of the other lines are at that same angle relative to the X' axis, the image is likely text and the second line 144 and the third line 146 are likely anomalies that may be ignored during analysis.

In one embodiment, the user is prompted as to whether the image contains text. For example during a scanning process, the user may be prompted as to whether the image is a text document. If the image is a text document, the analysis to determine skew angle may only analyze the lines having the most common intersect angle with the X' axis. This analysis is based on text lines in a text document being substantially parallel to each other. Therefore, lines that are not parallel to the majority of the lines are likely due to anomalies or other images, such as pictures or graphics on the document. For example, a newspaper article may contain text and a picture related to the text. The text will produce a plurality of lines that are substantially parallel, and the picture will likely produce lines that are skewed. Accordingly, the lines representing the picture likely do not reflect the skew angle of the document and may be disregarded. In the example shown in FIG. 7, only the lines 142 would be analyzed. The second line 144 and the third line 146 would be disregarded. On the other hand, if the image does not contain text, the third line 146 may be used to determine skew angle if it is much longer than the other lines.

Other embodiments exist for down-sampling the image data. In the example described above, sampling was achieved by calculating the average pixel value of the tiles 116, FIG. 2. In other embodiments, sampling is achieved by bilinear sampling, bicubic sampling, and weighted average sampling. In yet another embodiment, the image data has a low-pass filter or convolution applied to it prior to down sampling. The filtering serves to attenuate extraneous data to lessen its affect on the skew analysis.

Figure 8:
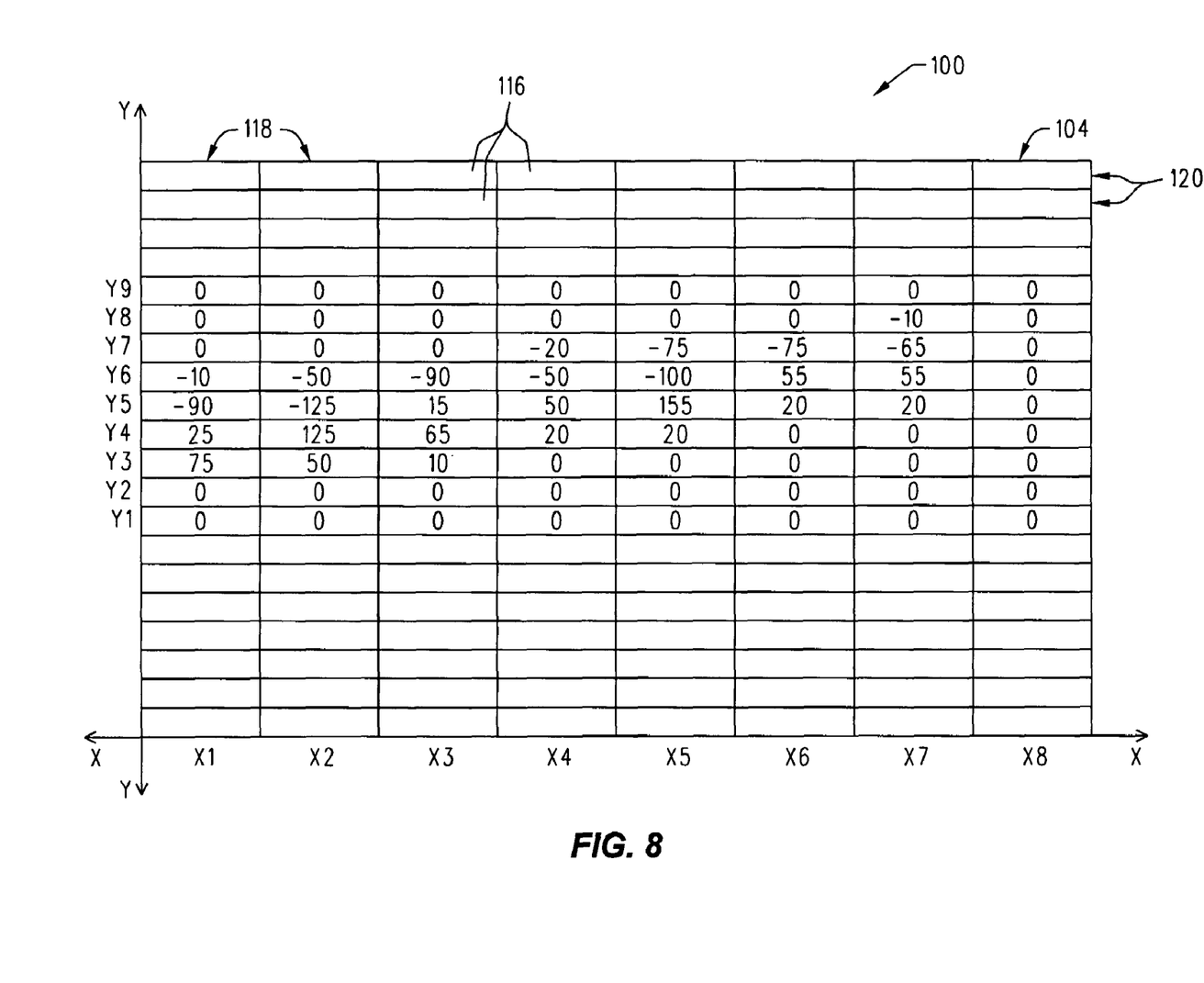
FIG. 8 is the array of FIG. 5 using a different embodiment of calculating the differences between pixel values.

Other embodiments also exist for detecting edges in the sampled data. In the embodiment described above, a minus one over one kernel was applied to the sampled data and negative results were set to zero. In another embodiment, the negative numbers are processed instead of being set to zero, which provides more data for the evaluation of the skew angle. An example of this kernel applied to the array of FIG. 4 is shown in FIG. 8. In the embodiment where the image is text, large negative numbers are representative of the upper edges of the characters and the large positive number are representative of the lower edges of the characters.

Figure 9:
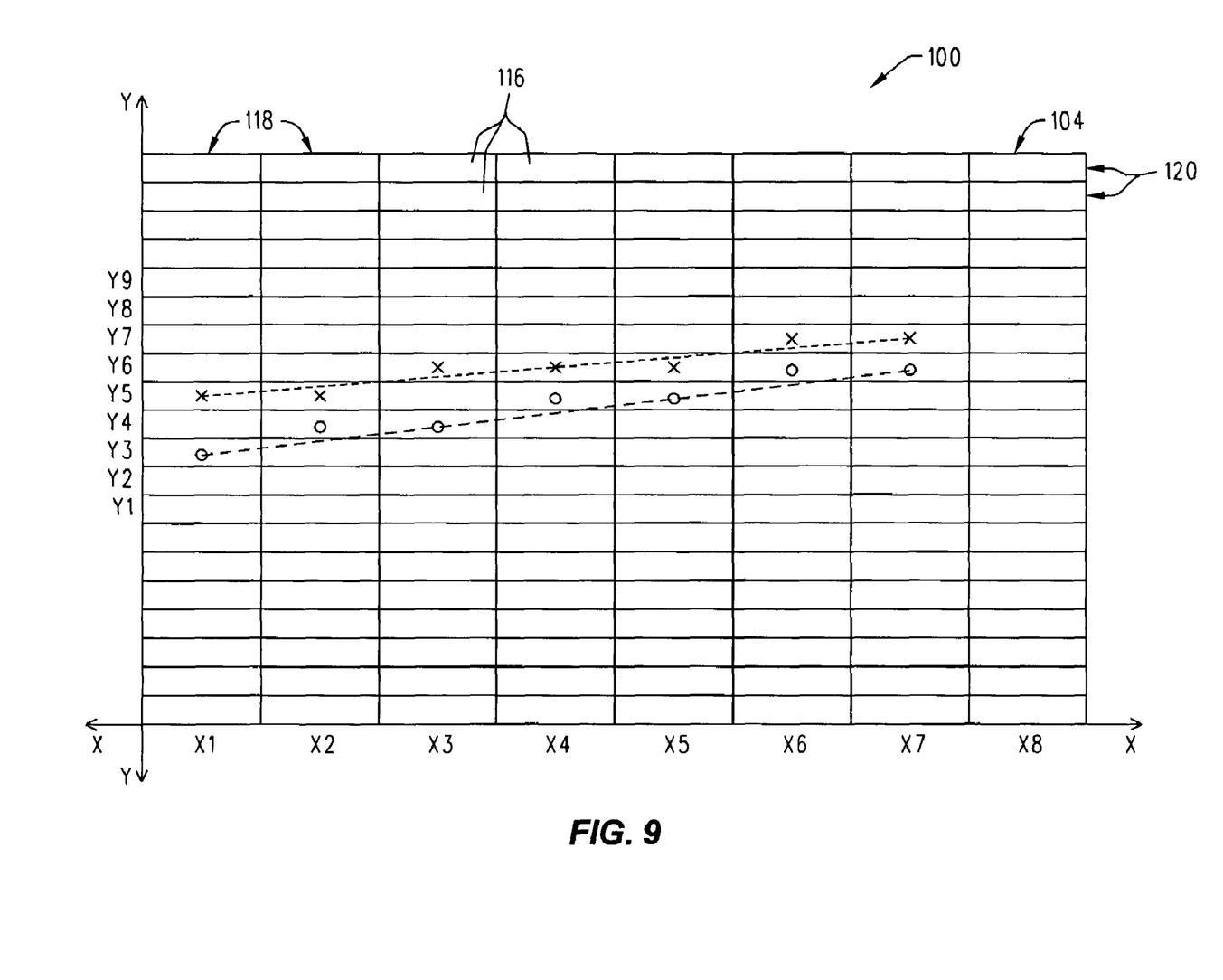
FIG. 9 is an embodiment of application of a searching criteria based on the array of FIG. 8.

The search for the first and subsequent differences may be performed in a similar manner as described above. However, the search in this embodiment includes searching for large negative numbers in the same manner that the aforementioned embodiments searched for large positive numbers. The results of this search are shown in the graph of FIG. 9. The line 132 is generated based on the search criteria described above. A second line 150 is generated based on a search of the greatest negative numbers. For example, column X1 may be searched for a first negative number that is at least a first preselected value. When this first negative difference is located, a second difference may be searched in column X2. The second negative difference may exceed a second preselected value and may be adjacent the first negative difference.

The slopes of the lines 132 and 150 may vary slightly due to noise and inaccuracies introduced through sampling. For example, in the embodiment wherein the image is text, the height of the characters tend to fluctuate, which causes the top edges of the characters to fluctuate. This fluctuation in the top edges of the characters will cause the line 150 to fluctuate and possibly be inaccurate. The fluctuation may also limit the length of the line 150 and may cause the search algorithms to yields a plurality of short lines relative to the lengths of the lines associated with the top edges of the characters.

Referring again to FIG. 5, in some situations, a column may not have a difference that meets the aforementioned second preselected values. For example, a text document may have punctuation or spaces that result in their tiles 118, FIG. 4, having low values. Accordingly, the differences associated with these low tile values will be small. In such situations, the second preselected value may be lowered or eliminated during a search of one or more columns. This lowered second preselected value enables a line to be generated through portions of the image where the bright/dark transitions are relatively subtle.

In a similar situation, a difference that meets the aforementioned first preselected value may not exist. In this situation, the first preselected value may be lowered to a point where the first difference may be located. If the first preselected value has to be lowered a great amount, the analysis may conclude that analysis of a skew angle is not prudent.

Referring again to FIG. 2, the skew angle θ has been described above as being relative to the X axis. In some embodiments, however, the skew angle may be calculated relative to the Y axis. In this embodiment, the downsampling may generate rectangular tiles wherein the height of the tiles is greater than the widths of the tiles. The differences between adjacent tiles are calculated along the rows 120 parallel to the X axis rather than the columns 118 parallel to the Y axis. Accordingly, the rows 120, instead of the columns 118, are searched for differences that meet preselected criteria. The tiles in these rows are then connected to form lines that are skewed relative to the Y axis. These lines are proportional to the skew angle as described above.

Detection of the skew angle relative to both the X axis and the Y axis may be performed in two separate steps. The step yielding the longest lines or the most constant lines may be selected as representing the skew angle. The image data may then be manipulated to offset the skew.

The search for second and subsequent differences may be conducted as a two step procedure conducted in opposite directions. In one embodiment, after the first difference is located, second and subsequent differences may be located in columns extending in a first direction that is generally parallel to the X axis. More differences may be located by searching columns in a second direction that is opposite the first direction. Thus, the first difference may correspond to a portion of text that is in the middle of a sentence. Second and subsequent differences may be located by searching in both left and right directions along the sentence, which correspond to the first and second directions. This extends the lengths of the strings of differences and typically improves the accuracy of determining the skew angle.

As described above, in one embodiment, the user is prompted as to whether the image represented by the image data contains text. The user may also be prompted as to whether the text is properly oriented. For example, if a portrait text document is scanned as a landscape document, the text will be misoriented by ninety degrees. Some of the above-described procedures for determining skew may not function properly in such a situation. Accordingly, if the text document is misoriented, it may be properly oriented prior to determining the skew. In one embodiment, the orientation is automatically determined by application of the methods set forth in the United States patent application of Oscar Zuniga, filed concurrently with this application, which is hereby incorporated by reference for all that is disclosed therein.

What is claimed is:

1. A method of determining a skew angle of an image relative to a first axis, said image being generated by a plurality of pixels, wherein each of said pixels is represented by a pixel value, said method comprising:

creating a first plurality of pixel groupings extending perpendicular to said first axis;

sampling at least one pixel value of each of said first plurality of pixel groupings;

creating a second plurality of pixel groupings extending perpendicular to said first axis;

sampling at least one pixel value of each of said second plurality of pixel groupings;

calculating differences between adjacent sampled pixel values in said first plurality of pixel groupings;

calculating differences between adjacent sampled pixel values in said second plurality of pixel groupings;

locating a first difference associated with said first plurality of pixel groupings, said first difference exceeding a first preselected value;

locating a second difference associated with said second plurality of pixel groupings;

fitting a second axis between said first difference and said second difference, said second axis having a slope relative to said first axis; and scaling said slope by the number of pixel values in each of said plurality of pixel groupings extending parallel and perpendicular to said first axis;

said skew angle being the angle between said first axis and an axis generated by the scaled second axis.

2. The method of claim 1, wherein said first plurality of pixel groupings is adjacent to said second plurality of pixel groupings.

3. The method of claim 1, wherein said first difference is adjacent to said second difference.

4. The method of claim 1 and further comprising a third plurality of pixel groupings extending perpendicular to said first axis, said third plurality of pixel groupings being located between said first plurality of pixel groupings and said second plurality of pixel groupings.

5. The method of claim 1, wherein said sampling at least one pixel value comprises calculating the average pixel value of at least two of said pixel values comprising a plurality of pixel groupings.

6. The method of claim 1, wherein said sampling at least one pixel value comprises applying weighted average sampling to a plurality of said pixel values comprising a plurality of pixel groupings.

7. The method of claim 1, wherein said calculating differences between adjacent sampled pixel values comprises applying a minus one over one kernel to the sampled pixel values.

8. The method of claim 1, wherein said calculating differences between adjacent sampled pixel values further comprises setting negative results of said calculating the differences to zero.

9. The method of claim 1, wherein said first difference is a negative number and is less than a second preselected value and wherein said second difference is a negative number.

10. The method of claim 9, wherein locating said second difference comprises locating a greatest negative difference in said second plurality of pixel groupings, said second difference being adjacent to said first difference.

11. The method of claim 1, wherein said second difference is a greatest difference adjacent to said first difference and is located in said second plurality of pixel groupings.

12. The method of claim 1, and further comprising:
creating several pluralities of pixel groupings extending perpendicular to said first axis, each plurality of pixel groupings comprising a number of pixels;
locating at least a third difference in one of said plurality of pixel groupings, said at least one third difference exceeding said first preselected value;
locating at least a fourth difference in said plurality of pixel groupings, said at least one fourth difference being adjacent said at least one third difference and not located in the plurality of pixel groupings that said at least one third difference is located;
fitting at least a third axis between said at least one third difference and its corresponding at least a fourth difference, said at least a third axis having a slope; and
scaling the slope of said at least a third axis by the number of pixel values in each of said plurality of pixel groupings extending parallel and perpendicular to said first axis;
said skew angle being an angle between the scaled third axis and said first axis.

13. The method of claim 1, and further comprising:
creating several pluralities of pixel groupings extending perpendicular to said first axis, each plurality of pixel groupings comprising a number of pixels;
locating at least a third difference in one of said plurality of pixel groupings, said at least one third difference exceeding said first preselected value;
locating at least a fourth difference in said plurality of pixel groupings, said at least one fourth difference being adjacent said at least one third difference and not located in the plurality of pixel groupings that said at least one third difference is located;
fitting at least a third axis between said at least one third difference and its corresponding at least a fourth difference, said at least a third axis having a slope; and
scaling the slope of said at least a third axis by the number of pixel values in each of said plurality of pixel groupings extending parallel and perpendicular to said first axis;
determining which is longer, said second axis or said third axis; and
said skew angle being an angle associated with the longer of either said second axis or said third axis.

14. The method of claim 1, wherein at least one of said pixel groupings is rectangular and comprises a first number of pixels extending parallel to said first axis and a second number of pixels extending perpendicular said first axis, said first number of pixels being greater than said second number of pixels.

15. The method of claim 14, wherein said first number of pixels is about four.

16. The method of claim 14, wherein said second number of pixels is about sixty-four.

17. The method of claim 12, and further comprising manipulating said image so as to rotate said image in a direction opposite to said skew and in an amount approximately equal to said skew angle.

18. A method of calculating a skew angle of an image relative to a firs axis, said image being represented by image data comprising a plurality of pixel values, said method comprising:
creating an array of pixel groupings, said array of pixel groupings comprising a first plurality of pixel groupings extending perpendicular to said first axis and a second plurality of pixel groupings extending parallel to said first axis;
sampling at least one pixel value in each of said pixel groupings;
calculating a difference between sampled pixel values of adjacent pixel groupings in said first plurality of pixel groupings;
locating a first difference that exceeds a first preselected value;
locating a second difference adjacent to said first difference, said second difference being in a first plurality of pixel groupings and next to a first plurality of pixel groupings that includes said first difference, said second difference being the greatest difference adjacent to said first difference;
fitting a first line between said first difference and said second difference, said first line having a slope;
scaling the slope of said first line relative to said first axis by an amount proportional to the number of pixel values in each of said pixel groupings extending perpendicular and parallel to said first axis; and
calculating an angle of intersection between the scaled first line and said first axis, said angle being said skew angle.

19. The method of claim 18, wherein said creating an array of pixel groupings comprises down-sampling said pixel values.

20. The method of claim 18, wherein at least one of said array of pixel groupings is rectangular and comprises a first number of pixels extending parallel to said first axis and a second number of pixels extending perpendicular to said first axis, said first number of pixels being greater than said second number of pixels.

21. The method of claim 18, wherein said sampling comprises calculating the average pixel value of at least two pixel values in at least one of said pixel groupings.

22. The method of claim 18, wherein said sampling comprises applying weighted averaging to at least two of said pixel values in at least one of said pixel groupings.

23. The method of claim 18, wherein said calculating the differences comprises applying a minus one over one kernel to the sampled pixel groupings.

24. The method of claim 18, and further comprising manipulating said image so as to rotate said image in a direction opposite said skew and in an amount approximately equal to said skew angle.

25. The method of claim 18 and further comprising locating subsequent differences to form a string of differences, said at least one first line being fit between said first difference and a last difference of said string of differences.

26. The method of claim 18, and further comprising:
locating at least one third difference in one of said first plurality of pixel groupings;
locating at least one fourth difference in one of said first plurality of pixel groupings, said at least one fourth difference being adjacent to said at least one third difference and not located in the first plurality of pixel groupings that said at least one third difference is located;
fitting a second line between said at least one third difference and its corresponding at least one fourth difference;
scaling the slope of said second line by the number of pixel values in each of said pixel groupings extending parallel and perpendicular to said first axis; and
analyzing the intersections of said scaled first line and the scaled second line with said first axis to determine said skew angle.

27. The method of claim 26, and further comprising locating subsequent differences to form a siring of differences, said second line being fit between said first difference and a last difference of said string of differences;
creating a plurality of lines extending between strings of differences;
herein said analyzing further comprises calculating the longest of said lines; and
wherein said skew angle corresponds to the angle associated with the longest line and the intersection of said first axis.

28. The method of claim 26, wherein said analyzing further comprises calculating the angle at which most lines intersect the first axis, said angle corresponding to the skew angle.

* * * * *

UNITED STATES PATENT AND TRADEMARK OFFICE
CERTIFICATE OF CORRECTION

PATENT NO. : 7,356,200 B2
APPLICATION NO. : 10/701282
DATED : April 8, 2008
INVENTOR(S) : Oscar A. Zuniga Page 1 of 1

It is certified that error appears in the above-identified patent and that said Letters Patent is hereby corrected as shown below:

In column 14, line 8, in Claim 14, after "perpendicular" insert -- to --.

In column 14, line 20, in Claim 18, delete "firs" and insert -- first --, therefor.

In column 15, line 3, in Claim 24, after "opposite" insert -- to --.

In column 16, line 6, in Claim 27, delete "siring" and insert -- string --, therefor.

In column 16, line 11, in Claim 27, delete "herein" and insert -- wherein --, therefor.

Signed and Sealed this

Twenty-eighth Day of April, 2009

JOHN DOLL
*Acting Director of the United States Patent and Trademark Office*